United States Patent
Ueoka et al.

(10) Patent No.: US 6,966,014 B2
(45) Date of Patent: Nov. 15, 2005

(54) METHOD FOR SYSTEM OBSTACLE CORRESPONDENCE SUPPORT

(75) Inventors: Atsushi Ueoka, Fujisawa (JP); Tsutomu Ito, Shiroyama (JP); Tadashi Yamagishi, Kawasaki (JP); Hiroshi Wada, Yokohama (JP); Keiichi Shiobara, Yamoto (JP); Takashi Matsumoto, Yokohama (JP); Yoji Kawashima, Hadano (JP)

(73) Assignees: Hitachi, Ltd., Tokyo (JP); Hitachi Software Engineering Co., Ltd., Yokohama (JP); Hitachi Electronics Services Co., Ltd., Tokyo (JP)

( * ) Notice: Subject to any disclaimer, the term of this patent is extended or adjusted under 35 U.S.C. 154(b) by 456 days.

(21) Appl. No.: 10/054,861

(22) Filed: Jan. 25, 2002

(65) Prior Publication Data

US 2002/0178407 A1 Nov. 28, 2002

(30) Foreign Application Priority Data

May 23, 2001 (JP) .............................. 2001-153381

(51) Int. Cl.⁷ ............................................ G06F 11/00
(52) U.S. Cl. ............................... 714/46; 714/57; 707/3
(58) Field of Search ......................... 714/46, 57; 707/3

(56) References Cited

U.S. PATENT DOCUMENTS

| | | | | |
|---|---|---|---|---|
| 5,483,637 A | * | 1/1996 | Winokur et al. | 714/26 |
| 5,748,880 A | * | 5/1998 | Ito et al. | 714/46 |
| 6,384,848 B1 | * | 5/2002 | Kojima et al. | 345/808 |
| 6,526,529 B1 | * | 2/2003 | Miksovsky et al. | 714/57 |
| 6,772,374 B2 | * | 8/2004 | Forman et al. | 714/46 |

OTHER PUBLICATIONS

Abstract of JP-10-312321.

* cited by examiner

Primary Examiner—Scott Baderman
(74) Attorney, Agent, or Firm—Mattingly, Stanger, Malur & Brundidge, P.C.

(57) ABSTRACT

To generate a command for dealing with error message from accumulated information and transmit the command to information processing as transmission place, a process analyzes error message received by a communication process, searches file based on analysis of the error message, and searches file based on search, to acquire related message. A process analyzes the error message and the related message, and searches file in which contents of recovery operation generated in process have been accumulated, for information whose recover operation condition is in agreement with the analyzed information. A process displays the contents of searched information on display. A process generates command based on recovery operation corresponding to recovery operation method selected by a keyboard or a mouse, and on the error message and the related message by process. The communication process transmits the generated command to information processor unit.

9 Claims, 14 Drawing Sheets

FIG.4

| TIME | SYSTEM NAME | MESSAGE | |
|---|---|---|---|
| 10:05:15 | CPU-A | JDJ1234 J123 AAA BBB CCC | 40a |
| 10:05:20 | SVR-B | JDJ1111 DDD EEE FFF GGG HHH | 40b |
| 10:05:27 | CPU-A | JDD5678 DDD T01 EEE FFF GGG | 40c |
| 10:05:45 | NODE-n | JAA3333 XXX YYY XXXXX ZZZZ | 40d |
| 10:05:46 | CPU-A | JBB8888 ABCD EFGH IJKL | 40e |
| 10:05:46 | CPU-A | JAB0123 HHHH IIII T01 JJJJ J123 | 40f |
| ⋮ | ⋮ | ⋮ | |

FIG.5

| SELECT CONDITION | CONDITION FOR SEARCHING RELATED MESSAGE | |
|---|---|---|
| WORD3=JSF621D<br>WORD4-M<br>WORD5-VOLUME | SEL1 : WORD1=JDJ1234,WORD2=WORD1<br>SEL2 : WORD1-JDD5678,WORD2-WORD11<br>⋮<br>SELn : INCLUDE=WORD1,WORD11 | 50a |
| WORD2-JDJ4511 | SEL1 : WORD1-WORD1,WORD2=JDJ5555<br>SEL2 : WORD1=JBB7777,WORD2=WORD3<br>SEL3 : WORD1=WORD1,WORD2-WORD3,WORD5=WORD4<br>⋮<br>SELn : INCLUDE=WORD1,WORD3,WORD4 | 50b |
| ⋮ | ⋮ | |

FIG.6

| KEYWORD | MEANING |
|---|---|
| WORDn | VALUE OF n-TH WORD OF MESSAGE TO BE DETECTED |
| INCLUDE | VALUE OF WORD INCLUDED IN MESSAGE TO BE DETECTED |
| TIME | TIME WHEN MESSAGE TO BE DETECTED WAS OUTPUTTED |
| SYSTEM | SYSTEM NAME WHICH OUTPUTTED MESSAGE TO BE DETECTED |

FIG.7

Table 60:

| ID (61) | SELECTION CONDITION (62) |
|---|---|
| 0001 | WORD2 PRINT WORD3=FORMAT WORD4=ERROR (60a) |
| 0002 | WORD2=JDJ4511 (60b) |
| .. | .. |

Table 70:

| ID (71) | CONDITION (72) |
|---|---|
| 0001 | SEL1:WORD1=EWORD5,WORD2 START WORD3-PRINT,WORD4=EWORD1 (70a) |
| 0002 | SEL1:WORD1=EWORD1,WORD2 STOP (70b) |
| 0003 | SEL1:WORD1-PRINT,WORD2-FORMAT WORD3-ENABLE (70c) |
| .. | .. |

Table 80:

| ID (81) | COMMAND FORMAT (82) |
|---|---|
| 0001 | STOP WORD1 (80a) |
| 0002 | WORD1 PRINT WORD2 FORMAT WORD3 WORD4 (80b) |
| 0003 | WORD1 PRINT WORD2 WORD3 (80c) |
| .. | .. |

Table 90:

| ID (91) | CONDITION ID (92) | CMD-ID (93) | SETTING INFORMATION (94) | TRANSMISSION PLACE (95) | DISPLAY NAME (96) |
|---|---|---|---|---|---|
| 0001 | EMSG=0001 RMSG=0001 | 0001 | WORD1=EWORD1 | ESYS | INTERRUPT OUTPUT (90a) |
| 0002 | EMSG=0001 RMSG=0001 | 0002 | WORD1=EWORD1,WORD2-EWORD5 WORD3=EMT-B,WORD4-RISYS | ESYS | OUTPUT IN CONVERTED FORMAT (90b) |
| 0003 | ID=0001 RESPONSE ID=0002 | 0003 | WORD1=EWORD1,WORD2-PRT2 WORD3-CPL-A | ESYS | OUTPUT TO PRT2 (90c) |
| 0004 | ID=0001 RESPONSE ID=0002 | 0003 | WORD1=EWORD1,WORD2-PRT3 WORD3=SVR-B | ESYS | OUTPUT TO PRT3 (90d) |
| 0005 | EMSG=0002 RMSG=0008 | 0007 | WORD1=C1S3EWORD1 | RISYS | CANCEL (90e) |
| .. | .. | .. | .. | .. | .. |

FIG.8

| KEYWORD | MEANING |
|---|---|
| EWORDn | VALUE OF n-TH WORD OF ERROR MESSAGE |
| RmWORDn | VALUE OF n-TH WORD OF RELATED MESSAGE WITH THE m-TH CONDITION |
| CISmWORDn | VALUE OF n-TH WORD OF REPLY MESSAGE WHICH IS IN AGREEMENT WITH THE m-TH CONDITION OF l-ST COMMAND |
| ESYS | SYSTEM WHICH OUTPUTTED ERROR MESSAGE |
| RnSYS | SYSTEM WHICH OUTPUTTED RELATED MESSAGE DETECTED ON THE n-TH CONDITION |
| CnSYS | SYSTEM WHICH TRANSMITTED n-TH COMMAND |

FIG.9

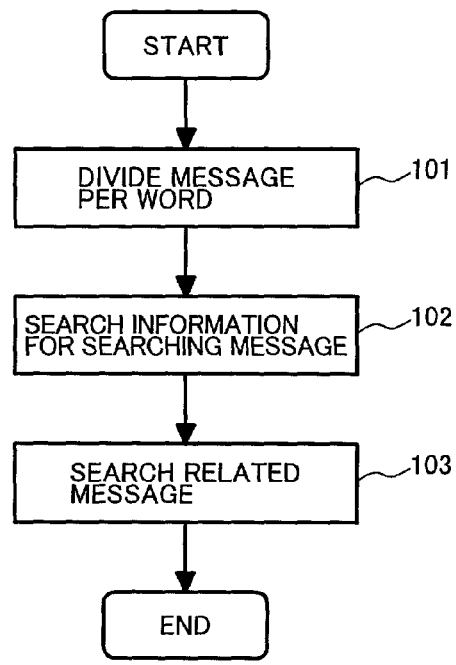

METHOD FOR SYSTEM OBSTACLE CORRESPONDENCE SUPPORT

BACKGROUND OF THE INVENTION

The present invention relates to a method for system obstacle correspondence support in an information processing system constituted by a plurality of information processing units. In the method, when an error message outputted by an information processing unit is received, a command is generated and transmitted in accordance with a method corresponding to the error message.

Conventionally, an information processing unit is provided with a console unit for managing interface between an operator and the information processing unit.

A message showing the operating state of the information processing unit is displayed on the console unit.

The message includes an error message showing error information of the information processing unit.

The operator inputs an appropriate command through the console unit in response to the error message so as to deal with an error.

JP-A-10-312321 discloses a method for supporting such input of a command corresponding to an error message.

According to the method disclosed in JP-A-10-312321, the following method is adopted and intended for a single on-line system. That is, messages outputted every fixed time unit before errors occurred, and operating states of hardware and software constituting the on-line system at the point of time when the errors occurred, are accumulated as cases together with error information and correspondence methods corresponding to the errors; and when an error occurs, error information generated with the error, messages accumulated until the error occurs, and operating states of the hardware and the software at the point of time when the error occurred, are compared with the respective pieces of information accumulated as cases, and a correspondence method for a case having most agreed information with the error is set as a correspondence method to the occurring error.

In addition, in each correspondence method, a correspondence command and a command for confirming the execution result of the correspondence command are defined for one case.

However, in an information processing system constituted by a plurality of information processing units, an error message may occur in one information processing unit because of an event occurring in another information processing unit.

In such a case, an operator has to investigate the cause of the error message from messages of the respective information processing units, and input a command corresponding to the cause.

Moreover, a plurality of commands may be inputted for one error message. In this case, a command to be inputted next may be determined on the basis of an execution result of a command inputted previously.

According to the method disclosed in JP-A-10-312321, in the case of an error message occurring in one information processing unit because of an event occurring in another information processing unit in an information processing system constituted by a plurality of information processing units, a command cannot be transmitted to the information processing unit in which the event occurred.

In addition, according to the method disclosed in JP-A-10-312321, a plurality of commands cannot be inputted for one error message on the basis of execution results on the respective commands.

An object of the present invention is to acquire, from all the information processing units, messages required for investigation of the cause of an error message occurring in one information processing unit in an information processing system constituted by a plurality of information processing units.

Another object of the present invention is to accumulate information in which messages acquired for investigation of a cause of an error message occurring in an information processing unit are made to correspond to a command inputted to deal with an error in an information processing system constituted by a plurality of information processing units, search the accumulated information when a similar event occurs, and explicitly address an obstacle correspondence method to an operator.

A further object of the present invention is to generate, from the accumulated information, a command for dealing with the error message, select an information processing unit as a transmission place of the command, and transmit the command to the information processing unit.

A still further object of the present invention is to accumulate information in which messages acquired for investigation of a cause of an error message occurring in an information processing unit are made to correspond to an execution order and execution conditions of a plurality of commands inputted to deal with an error in an information processing system constituted by a plurality of information processing units, search the accumulated information when a similar event occurs, and execute the commands in accordance with the execution order and the execution conditions of the commands.

In order to achieve the above objects, according to the present invention, there is provided a method for system obstacle correspondence support in a console system having a control unit including a display unit, an input unit, means for acquiring messages from at least one information processing unit, storage means for storing the acquired messages, and a storage unit for storing data for supporting correspondence to an error message indicating an error and acquired from the information processing unit, wherein first data for identifying the error message and second data for identifying a related message related to the error message are included in a part of the data in the storage unit, and a character string constituting the error message is defined as a part of the first data, while a character string constituting a message to be searched as the related message is defined as a part of the second data; and wherein when the character string of the first data is included in an error message acquired from the information processing unit, the second data is selected, a message including the character string of the selected second data is searched from the storage means, and the searched message is set as a related message to the error message.

Further, preferably, a value of the character string constituting the error message and a position of the value of the character string in the error message are defined as a part of the first data, while a value of a character string constituting a message to be searched as the related message and a position of the character string are defined as a part of the second data; the second data is selected when the value of the character string defined in the first data is included in the position of the character string defined in the first data in an error message acquired from the information processing unit; a message in which the value of the character string defined in the second data is included in the position of the character string defined in the second data is searched from the storage means; and the searched message is set as a related message to the error message.

Further, preferably, third data in which the first data is associated with the second data used for searching the related message is accumulated in the storage unit; and when a command inputted from the input unit for an error message and a related message in agreement with the third data includes a character string constituting the error message, the related message, or a reply message to a command inputted previously, a command format in which a portion of the character string included in the command is replaced by information indicating a position of the character string of the error message, the related message or the reply message is accumulated as fourth data in the storage unit.

Further, preferably, when a plurality of commands are inputted for an error message and a related message in agreement with the third data, third data to which information for identifying a reply message to a command inputted previously is added, and fourth data indicating a command following the previously inputted command are accumulated in the storage unit.

Further, preferably, when the error message and the related message to the error message are in agreement with the third data, all of the fourth data corresponding to the third data are selected as correspondence methods to the error message and the related message; and the fourth data selected as the correspondence methods are displayed on the display unit.

Further, preferably, when the third data in which information for identifying the third data used for selecting the fourth data is included as identification information is present, the fourth data corresponding to the third data having the identification information is selected as a correspondence method to be carried out next to the fourth data; and the fourth data selected as the correspondence methods are displayed on the display unit in accordance with an order with which the correspondence method are to be carried out.

Further, preferably, for a portion of information included in an error message or a related message for which correspondence methods are to be generated or in a reply message to a command carried out previously, which information indicates a position of a specific character string in the error message, the related message or the reply message, a character string in a position designated by the information indicating the position of the error message, the related message or the reply message is substituted to generate a command in accordance with the command format of the fourth data corresponding to a correspondence method displayed on the display unit and selected by the input unit; and an information processing unit to which the generated command is to be transmitted is selected on the basis of information designating a transmission place of a command in the fourth data, and the generated command is transmitted to the selected information processing unit.

Further, preferably, when a correspondence method to be carried out next is present after the command is carried out, the correspondence method to be carried out next is carried out if a reply message to the command is in agreement with information for identifying a reply message to the command in the third data.

BRIEF DESCRIPTION OF THE DRAWINGS

FIG. 4 is a diagram showing an example of a record format of message records stored in a table for information of message log;

FIG. 5 is a diagram showing an example of a record format of related message information records stored in a file of conditions for searching messages;

FIG. 6 is a diagram showing keywords which can be defined in records of information for searching related messages;

FIG. 7 is a diagram showing examples of a record format of records of error message selection conditions, a record format of records of message selection conditions, a record format of records of command formats and a record format of records of recovery operation information, all these records being stored in a file of recovery operation information;

FIG. 8 is a diagram showing keywords which can be defined in records of message selection information and records of recovery operation information;

FIG. 9 is a flow chart showing a process flow of a process for searching a related message;

DETAILED DESCRIPTION OF THE INVENTION

An embodiment of the present invention will be described with reference to FIGS. 1 to 18.

Figure 1:
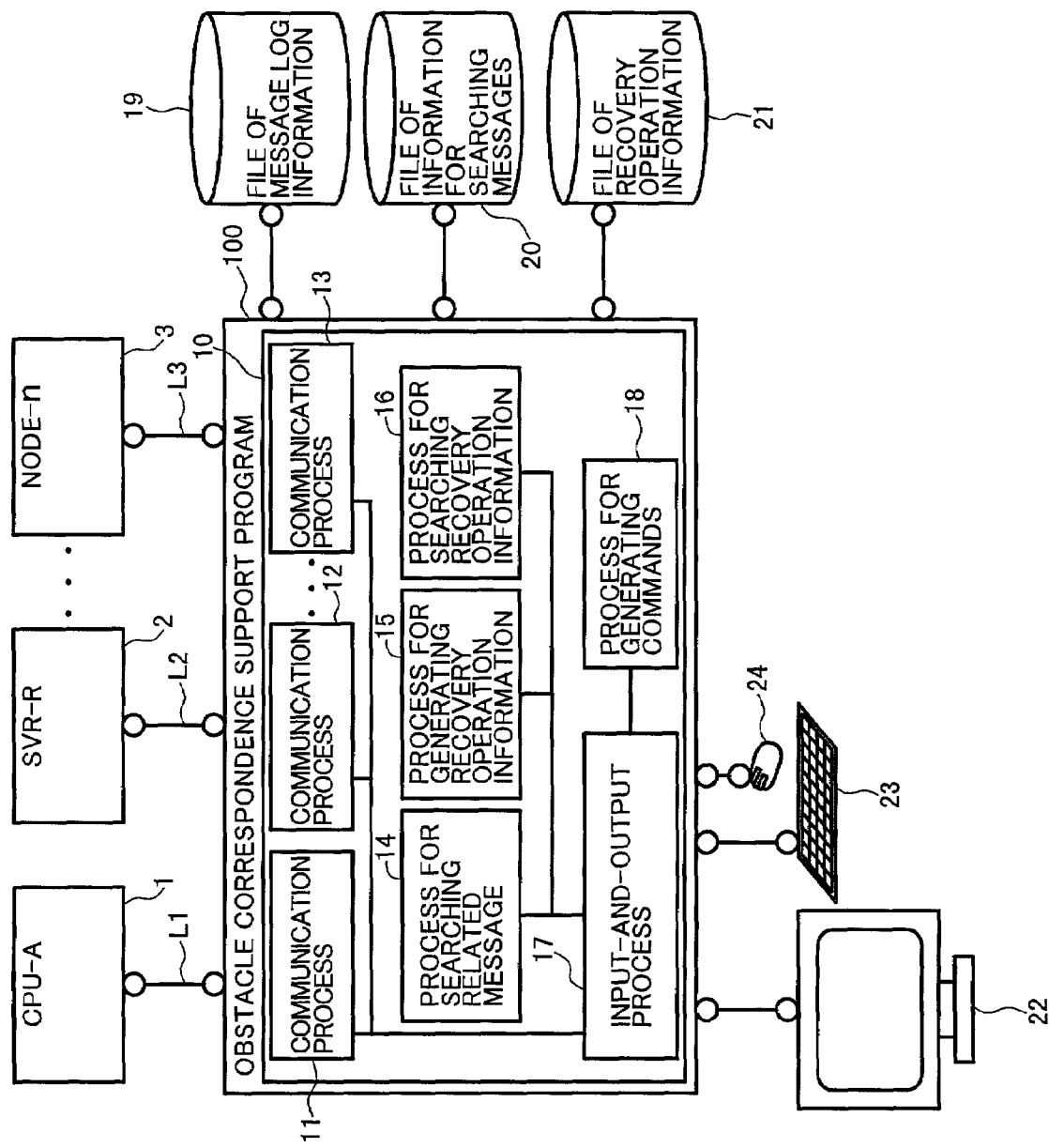
FIG. 1 is a diagram showing the configuration of an information processing system to which a method for system obstacle correspondence support according to the present invention is applied.

FIG. 1 shows the configuration of an information processing system to which a method for system obstacle correspondence support according to the present invention is applied.

In FIG. 1, the reference numerals 1, 2 and 3 represent information processing units, respectively shown as CPU-A, SVR(open server)-B, and NODE(network node)-n. Incidentally, the kinds of the information processing units 1, 2 and 3 are not limited.

That is, they may be information processing units such as mainframes, open servers, network nodes, various kinds of monitors, and so on, which can output their own operating states in the form of messages and which can be operated by command.

The information processing units 1, 2 and 3 are connected to a control unit 100 through lines L1, L2 and L3.

Incidentally, the kinds of the lines L1, L2 and L3 are not limited. That is, the lines L1, L2 and L3 may be leased circuits, or LAN (Local Area Network) as typified by Ethernet, or public circuits.

The control unit 100 has data processing capacity, and can be realized by a personal computer or a work station.

Specifically, an OS such as UNIX, MS-Windows or the like may be operated in the control unit 100.

In FIG. 1, description about the OS such as UNIX, MS-Windows or the like is omitted.

A message log information file 19 for accumulating messages outputted by the information processing units 1, 2 and 3 is connected to the control unit 100.

In addition, a message searching information file 20 for searching messages related to the error messages outputted by the information processing units 1, 2 and 3, from the message log information file 19 is connected to the control unit 100.

In addition, a recovery operation information file 21 for accumulating information of commands inputted for dealing with the error messages and the related messages to the error messages is connected to the control unit 100.

Further, a display unit 22, a keyboard 23 and a mouse 24 are connected to the control unit 100.

An obstacle correspondence support program 10 for realizing a method for system obstacle correspondence support according to the present invention operates in the control unit 100.

The obstacle correspondence support program is constituted by the following processing portions.
(1) communication processes 11, 12 and 13
(2) a process 14 for searching a related message
(3) a process 15 for generating recovery operation information
(4) a process 16 for searching recovery operation information
(5) an input-and-output process 17
(6) a process 18 for generating commands In the communication processing programs 11, 12 and 13, messages or commands are exchanged with the information processing units 1, 2 and 3 through the lines L1, L2 and L3.

For example, the communication processes 11, 12 and 13 correspond to the information processing units 1, 2 and 3 respectively.

In the communication 11, 12 and 13, all the messages acquired from the information processing units are stored in the file 19 of message log information.

Incidentally, the number of information processing units is not limited in the present invention.

In the process 14 for searching a related message, a message related to an error message received from an information processing unit is searched from the file 19 of message log information with reference to the file 20 of information for searching messages.

In the process 15 for generating recovery operation information, information of a command inputted from the keyboard 23 for the error message and the related message searched in the related message searching process is stored in the file 21 of recovery operation information.

In the process 16 for searching recovery operation information, information of a command for dealing with the error message and the related message is searched from the file 21 of recovery operation information.

In the input-and-output process 17, messages received from the information processing units 1, 2 and 3, error messages, related messages, and information of commands searched in the process 16 for searching recovery operation information, are displayed on the display unit 22, and input information is acquired from the keyboard 23 or the mouse 24.

In the input-and-output process 17, execution instructions are sent to the communication processes 11, 12 and 13, the process 15 for generating recovery operation information, the process 16 for searching recovery operation information, and the process 18 for generating commands, in accordance with the contents of the acquired input information.

In the process 18 for generating commands, commands are generated on the basis of the information of commands searched in the process 16 for searching recovery operation information.

Next, the summaries of the respective processes will be described.

Figure 2:
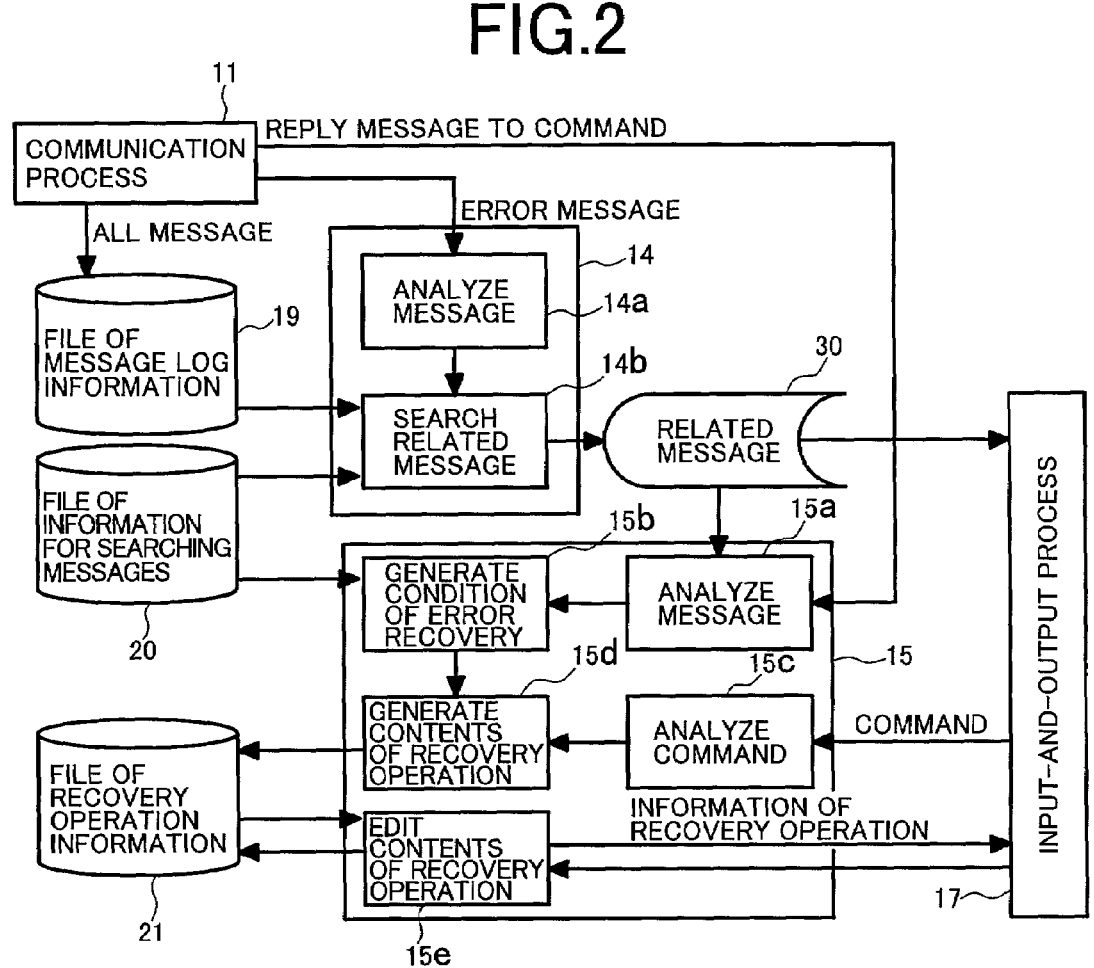
FIG. 2 is a diagram showing the procedure for detecting a related message to an error message, and accumulating information of a command inputted for the error message.

FIG. 2 shows briefly the process 14 for searching a related message and the process 15 for generating recovery operation information.

Incidentally, only one communication process (communication process 11) is shown in FIG. 2 for convenience's sake.

The process 14 for searching a related message analyzes an error message received from the communication process 11 (14*a*).

Next, on the basis of the analyzed information, information for searching a related message to the error message is acquired from the file 20 of information for searching messages, and a message in agreement with the acquired information is searched from the file 19 of message log information, and outputted as a related message 30 (14*b*).

The related message 30 is displayed on the display unit 22 in the input-and-output process 17.

Incidentally, the file 19 of message log information stores all the messages acquired from the information processing unit in the communication process 11.

In the process 15 for generating recovery operation information, the related message 30 is analyzed (15*a*).

Next, a condition for searching recovery operation information is generated on the basis of the information obtained by the analysis of the related message and the information in the message searching information file 20 used in the process for searching a related message (15*b*).

Next, a command inputted from the keyboard 23 is received from the input-and-output process 17, and the received command is analyzed (15*c*).

Contents of recovery operation are generated on the basis of the information obtained by the analysis of the command, associated with the recovery operation condition generated in the step 15*b*, and stored in the file 21 of recovery operation information (15*d*).

When a plurality of commands are inputted for the error message and the related message, the above-mentioned processing is carried out on the first one of the commands.

The method for generating a recovery operation condition in the step 15*b* for the second command et seq. differs from that for the first command.

Specifically, a reply message which shows the result of execution of a command inputted previously is analyzed (15*a*), and the information obtained by the analysis of the reply message and the recovery operation condition for the command inputted previously are combined to generate a recovery operation condition (15b).

While the information stored in the file 21 of recovery operation information is displayed on the display unit 22, the displayed contents may be edited by the keyboard 23 or the mouse 24 so that the information stored in the file 21 of recovery operation information can be changed in accordance with the edited contents (15e).

Figure 3:
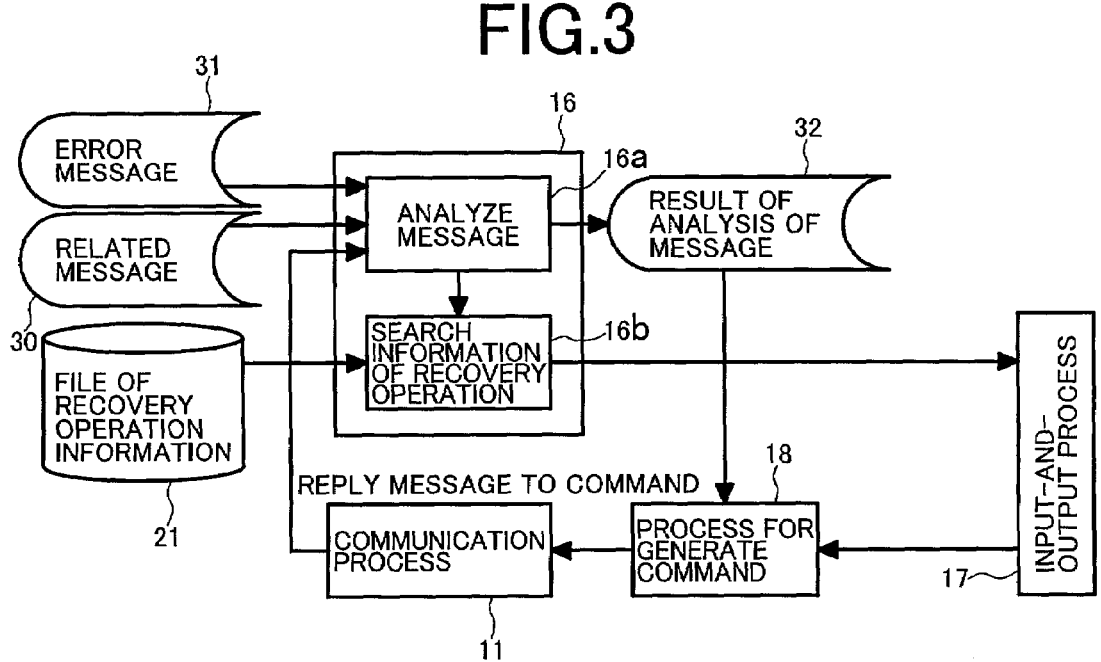
FIG. 3 is a diagram showing the procedure for searching recovery operation information corresponding to the error message and the related message, and dealing with an error on the basis of the recovery operation information.

FIG. 3 shows briefly processing in the process 16 for searching recovery operation information and in the process 18 for generating commands.

Incidentally, in FIG. 3, only one communication process (communication process 11) is shown for convenience's sake.

In the process 16 for searching recovery operation information, the error message 31 and the related message 30 searched in the process 14 for searching a related message are analyzed (16a).

Next, information whose recovery operation condition is in agreement with the analyzed information is searched from the file 21 of recovery operation information (16b). The contents of the searched information are displayed on the display unit 22 in the input-and-output process 17.

In the process 18 for generating commands, a command is generated on the basis of the contents of recovery operation corresponding to a recovery operation method selected by the keyboard 23 or the mouse 24, and a result 32 of the analysis of the error message 31 and the related message 30 in the process 16 for searching recovery operation information.

The generated command is transmitted to the information processing unit in the communication process 11.

When there is a command to be executed next to the transmitted command, a reply message which is a result of execution of the transmitted command is analyzed (16a).

In the process 18 for generating commands, commands are generated on the basis of the recovery operation information, and the result of the analysis of the error message, the related message and the reply message.

Next, description will be made about various pieces of information stored in the file 19 of message log information, the file 20 of information for searching messages, and the file 21 of recovery operation information, which are used in the respective processes.

FIG. 4 shows a format of message records 40 stored in the file 19 of message log information.

The message record format is constituted by a time 41 when a message was generated, a system name 42 of an information processing unit which outputted the message, and the generated message 43.

A record 40a shows a message "JDJ1234 J123 AAA BBB CCC" generated in the information processing unit CPU-A at 10:05:15.

FIG. 5 shows a format of records 50 of information for searching related messages, which are stored in the file 20 of information for searching messages.

Each of the records 50 of information for searching related messages is constituted by a selection condition 51 and a condition 52 for searching a related message.

The selection condition 51 is a condition for identifying an error message using the condition 52 for searching a related message.

That is, when an error message is in agreement with the selection condition 51, a related message is searched by use of the condition 52 for searching a related message.

In the selection condition 51, positions and values of WORDs constituting an error message as a target are set in the form of "WORDn=value of WORD".

In a record 50a, an error message whose third WORD is "JSF621D", whose fourth WORD is "m", and whose fifth WORD is "VOLUME", is set as a target.

The condition 52 for searching a related message defines the condition of a message to be searched as a related message.

A plurality of conditions can be defined in the condition 52. Each condition is defined as SELn.

Each condition is defined by designating a keyword shown in FIG. 6.

WORDn is defined in the form of "WORDn=character string" or "WORDn=WORDm".

"WORDn=character string" means that a message is detected if the value of the n-th WORD of the message is in agreement with the designated character string.

"WORDn=WORDm" means that a message is detected if the value of the n-th WORD of the message is in agreement with the value of the m-th WORD of the error message.

INCLUDE is defined in the form of "INCLUDE=character string" or "INCLUDE=WORDn".

"INCLUDE=character string" means that a message is detected if the message includes the character string.

"INCLUDE=WORDn" means that a message is detected if the message includes the value of the n-th WORD of the error message.

TIME is defined in the form of "TIME=n".

"TIME=n" means that messages generated n seconds before occurrence of the error message are set as messages to be searched.

SYSTEM is defined in the form of "SYSTEM=system name". "SYSTEM=system name" means that a related message is searched from messages generated in an information processing unit designated by the system name.

The condition 52 for searching a related message is defined using the above-mentioned keywords.

In the record 50a in FIG. 5, n searching conditions are defined.

A first condition SEL1 shows that a message whose first WORD is JDJ1234 and whose second WORD is in agreement with the value of the first WORD of the error message is detected.

A second condition SEL2 shows that a message whose first WORD is JDD5678 and whose second WORD is in agreement with the value of the 11th WORD of the error message is detected.

An n-th condition SELn shows that a message which includes the value of the first WORD and the value of the 11th WORD of the error message is detected.

FIG. 7 is a diagram showing a format of records 60 of error message selection condition, a format of records 70 of message selection condition, a format of records 80 of command format and a format of records 90 of recovery operation information, these records 60, 70, 80 and 90 being stored in the file 21 of recovery operation information.

The records 60 of error message selection condition store information for selecting error messages using the records 90 of recovery operation information. Each record 60 is constituted by an ID 61 and a selection condition 62.

The ID 61 is an ID for identifying the record.

The contents of the selection condition 62 are the same as those of the selection condition 51 of the record 50 of information for searching a related message.

The records 70 of message selection condition store information for selecting related messages or reply messages using the records 90 of recovery operation information. Each record 70 is constituted by an ID 71 and a condition 72.

The ID 71 is an ID for identifying the record.

The condition 72 defines a condition for a related message or a reply message.

A plurality of conditions can be defined in the condition 72. Each condition is defined as SELn.

Each condition is defined by designating EWORDn, RmWORDn and ClSmWORDn of the keywords shown in FIG. 8.

EWORDn shows the value of the n-th WORD of the error message.

RmWORDn shows the value of the n-th WORD of a related message in agreement with the condition of SELm of the record 70 of message selection condition.

ClSmWORDn shows the value of the n-th WORD of a reply message to the l-th command transmitted for an error, which value is in agreement with the condition of SELm of the record 70 of message selection condition.

In a record 70b, a message satisfying the following two conditions is selected.

(1) The value of the first WORD is in agreement with the value of the first WORD of the error message.
(2) The value of the second WORD is "STOP".

The records 80 of command format store formats of commands to transmit to the information processing unit. Each record 80 is constituted by an ID 81 and a command format 82.

The ID 81 is an ID for identifying the record. The command format 82 is a format of a command to be transmitted to the information processing unit.

Incidentally, in the command format, a character string including WORDn may be designated. Then, WORDn is substituted for a character string designated in the record 90 of recovery operation information.

The records 90 of recovery operation information store contents of recovery operation for error messages.

Each record 90 of recovery operation information is constituted by an ID 91, a condition ID 92, a CMD-ID 93, setting information 94, a transmission place 95, and a display name 96.

The ID 91 is an ID for identifying the record.

The condition ID 92 defines a condition for carrying out a recovery process using this record.

For example, "EMSG=0001" and "RMSG=0001" defined in a record 90a mean that this record 90a is selected when the error message can be selected on the selection condition 62 in a record of the error message selection condition records 60 whose ID 61 is 0001 (according to EMSG=0001), and the related message is in agreement with the condition 72 in a record of the message selection condition records 70 whose ID 71 is 0001 (according to RMSG=0001).

Besides, for example, "ID=0001" and "Reply ID=0002" are defined in a record 90c. This means that the record 90c is selected when a reply message of a command "ID=0001" defined in a record (record 90a) of the recovery operation information records 90 whose ID 91 is 0001 is in agreement with the condition 72 of a record (record 70b) of the message selection condition records 70 whose ID 71 is 0002. That is, this means that a plurality of commands are transmitted when there occurs an error designated by the condition ID 92 of the record 90a.

The CMD-ID 93 sets a command to be executed when there occurs an error designated by the condition ID 92.

The contents to be set in the CMD-ID 93 is the ID 81 of the command format record 80.

For example, if "0001" is defined in the CMD-ID 93 in the record 90a, it means that a command in the command format record 80a is executed.

In the setting information 94, a character string to be substituted for WORDn included in the command format 82 of the command format record 80 designated by the CMD-ID 93 is defined in the form of "WORDn=character string".

Information for selecting an information processing unit as a transmission place of the command is defined in the transmission place 95.

The keywords shown in FIG. 8 can be designated in the setting information 94 and the transmission place 95.

EWORDn, RmWORDn and ClSmWORDn are just as described in the records of message selection condition.

ESYS designates an information processing unit which outputted the error message.

RnSYS designates an information processing unit which outputted the related message in agreement with the condition of SELn in the message selection condition record 70.

CnSYS designates an information processing unit which transmitted an n-th command for the error.

For example, if the setting information 94 is "WORD1=EWORD1" in the record 90a, it means that the value of the first WORD of the error message is substituted for the portion of WORD1 of the command format 82. In addition, if the transmission place 95 is ESYS, it means that the generated command is transmitted to an information processing unit which outputted the error message.

Similarly, for example, a record 90e means that the value of the fourth WORD of a message which is a reply message to the l-th command and which is in agreement with the condition of SEL3, is substituted for the portion of WORD1 of the command format 82, while an information processing unit which outputted a related message in agreement with the condition of SELL1 is set as the transmission place of the command.

The display name 96 designates a name to be displayed on the display unit 22.

The records 60 of error message selection condition, the records 70 of message selection condition, the records 80 of command format, and the records 90 of recovery operation information are registered in the recovery operation information file in advance.

In addition, the respective records may be automatically generated and registered from commands inputted from the keyboard 23 by the operator.

The process for automatically generating and registering the respective records will be described in detail with reference to FIGS. 10 to 14.

Next, the process for searching a related message will be described with reference to FIG. 9.

FIG. 9 shows a process flow chart in which the process 14 for searching a related message searches a message related to an error message received from the communication process 11, 12 or 13.

In the process 14 for searching a related message, an error message acquired from the communication process 11, 12 or 13 is divided per WORD (Step 101).

Next, of the records 50 of information for searching a related message, a record in which the value of WORD of the error message is in agreement with the value of WORD designated by the selection condition 51 is searched from the file 20 of information for searching messages (Step 102).

When a plurality of records of information for searching related messages are detected at this time, a record having a largest number of conditions in the selection condition 51 is selected.

Next, a message in agreement with the related message searching condition 52 of the acquired record 50 of information for searching a related message is searched from the file 19 of message log information (Step 103).

The related message searched in the above-mentioned process for searching a related message is displayed on the display unit 22 in the input-and-output process 17.

Referring to the error message and the related message displayed, the operator inputs a command, or an instruction to display the contents of recovery operation, from the keyboard 23 or the mouse 24.

The input-and-output process 17 acquires the inputted contents.

If a command is inputted, the command is transmitted to a designated information processing unit through a corresponding communication process, while the process 15 for generating recovery operation information is executed to generate recovery operation information.

If an instruction to display the contents of recovery operation is inputted, the process 16 for searching recovery operation information is executed to search a corresponding method of recovery operation.

Next, the process for generating recovery operation information will be described with reference to FIGS. 10 to 14 showing process flow charts of the process 15 for generating recovery operation information.

Figure 10:
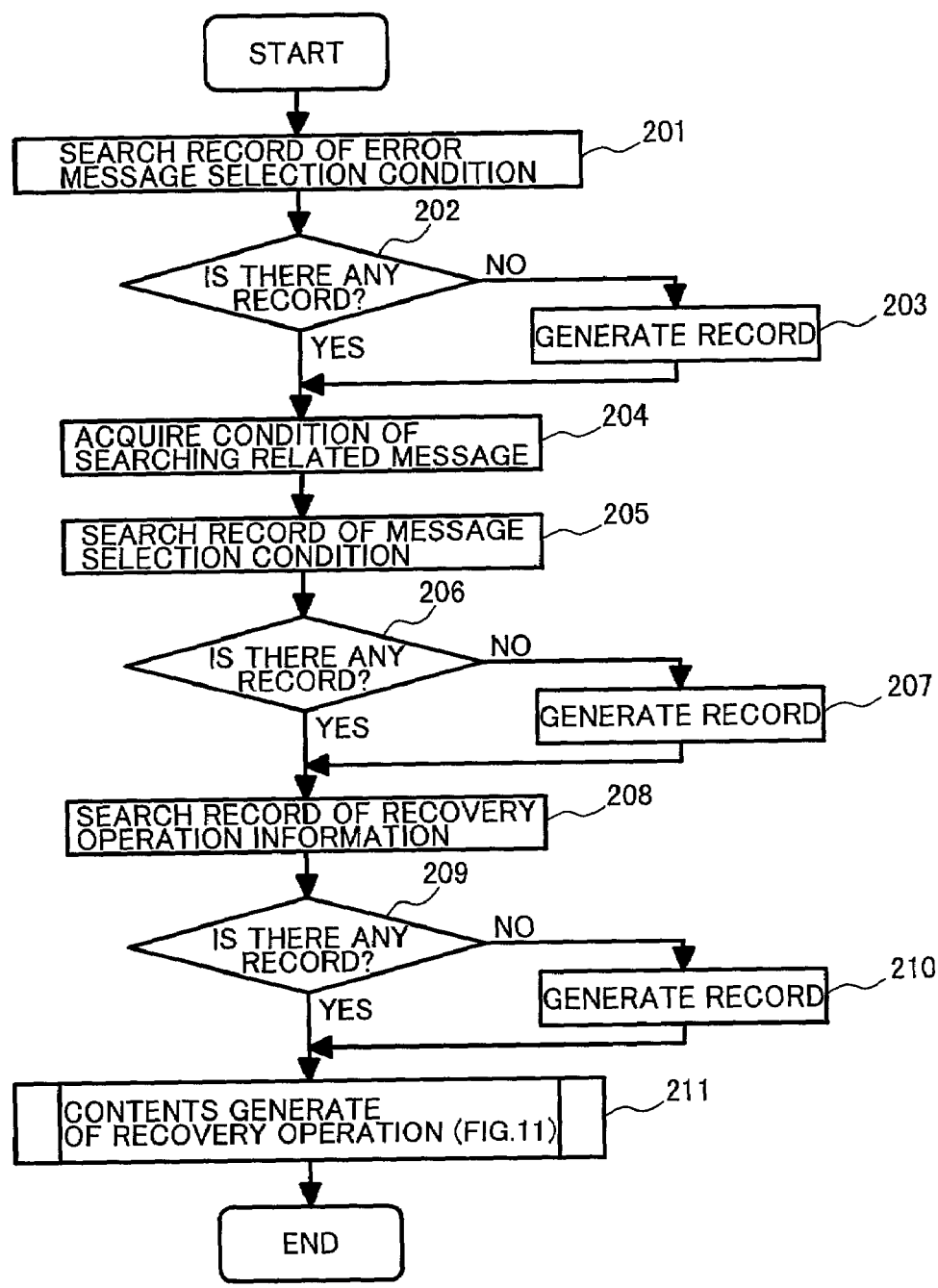
FIG. 10 is a flow chart showing a process flow of a process for generating recovery operation information.

The process 15 for generating recovery operation information starts at the process flow of FIG. 10.

In the process 15 for generating recovery operation information, the records 60 of error message selection condition are searched for a record whose selection condition 62 is in agreement with the selection condition 51 of the related message searching information record 50 used for searching a related message to the error message (Step 201).

When such a record of error message selection condition is absent, an error message selection condition record 60 in which the contents of the selection condition 51 of the record 50 of information for searching a related message is set as the selection condition 62 is generated and registered (Step 203).

Next, only conditions used for selecting a related message really detected are extracted from the information of the related message searching condition 52 of the related message searching condition record used for searching the related message (Step 204).

The records 70 of message selection condition are searched for a record whose condition 72 is in agreement with the extracted conditions (Step 205).

When such a record of message selection condition is absent, a message selection condition record 70 in which the extracted conditions are set as the condition 72 is generated and registered (Step 207).

Next, the records 90 of recovery operation information are searched for a record in which the ID 61 of the searched or generated record 60 of error message selection condition and the ID 71 of the searched or generated record 70 of message selection condition are set as the condition ID 92 (Step 208).

When such a record 90 of recovery operation information is absent, a recovery operation information record in which the ID 61 of the searched or generated record 60 of error message selection condition and the ID 71 of the searched or generated record 70 of message selection condition are set as the condition ID is generated (Step 210).

Next, the contents of recovery operation (CMD-ID 91, setting information 92, and so on) corresponding to the searched or generated record 90 of recovery operation information are generated (Step 211). Then, the process 15 for generating recovery operation information is terminated.

Figure 11:
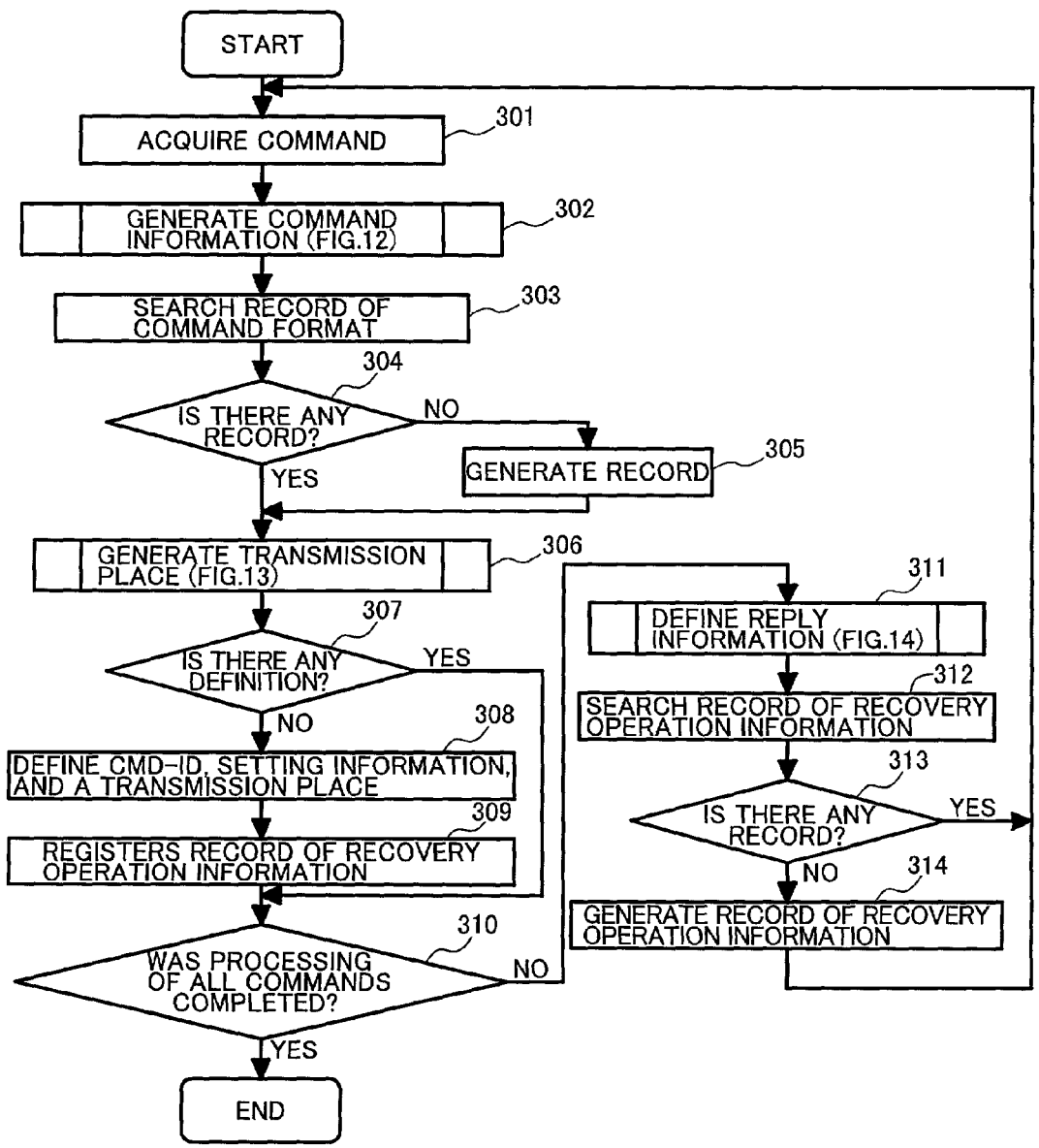
FIG. 11 is a flow chart showing a process flow of the process for generating recovery operation information.

FIG. 11 is a flow chart of the process for generating the contents of recovery operation (Step 211 in FIG. 10).

One of commands inputted for an error message is acquired in the order in which the commands were inputted (Step 301). Information to be set in the command format 82 of the record 80 of command format and information to be set in the setting information 94 of the record 90 of recovery operation information are generated for the acquired command (Step 302). The detail of Step 302 will be described with reference to FIG. 12.

Next, the command format records 80 are searched for a record whose command format 82 is in agreement with the command format generated in Step 302 (Step 303). When such a command format record 80 is absent, a command format record 80 is generated and registered while the command format generated in Step 302 is set as the command format 82 (Step 305).

Next, information for selecting a transmission place (information processing unit) of the acquired command is generated (Step 306). The detail of Step 306 will be described with reference to FIG. 13.

Next, it is confirmed whether a record 90 of recovery operation information whose CMD-ID 93 is in agreement with the ID of the command format record 80, whose setting information 94 is in agreement with the setting information generated in Step 302, and whose transmission place 95 is in agreement with the information for selecting a transmission place generated in Step 306, has been defined or not (Step 307). When such information has not been defined yet, such information is defined in a record 90 of recovery operation information (Step 308), and the record 90 of recovery operation information is registered (Step 309).

Next, it is judged whether the process from Step 302 to Step 309 has been carried out or not on all the commands inputted for the error message (Step 310). When the process has been carried out on all the commands, the process is terminated.

If the process has not been carried out on all the commands, a record 70 of message selection condition corresponding to a reply message is generated or acquired (Step 311). The detail of Step 311 will be described with reference to FIG. 14.

Next, the records 90 of recovery operation information are searched for a record in which the ID 91 of the recovery operation information record 90 in editing and the ID 71 of the message selection condition record 70 generated in Step 310 are set as the condition ID (Step 312). If such a record is absent, a record 90 of recovery operation information in which the ID 91 of the recovery operation information record 90 in editing and the ID 71 of the message selection condition record 70 generated in Step 310 are set as the condition ID is generated (Step 314).

Next, the recovery operation information record 90 acquired in Step 312 or generated in Step 314 is set as a recovery operation information record to be edited. Then, the process returns to Step 301 so as to acquire the next command, and Step 302 et seq. are carried out on the command.

Figure 12:
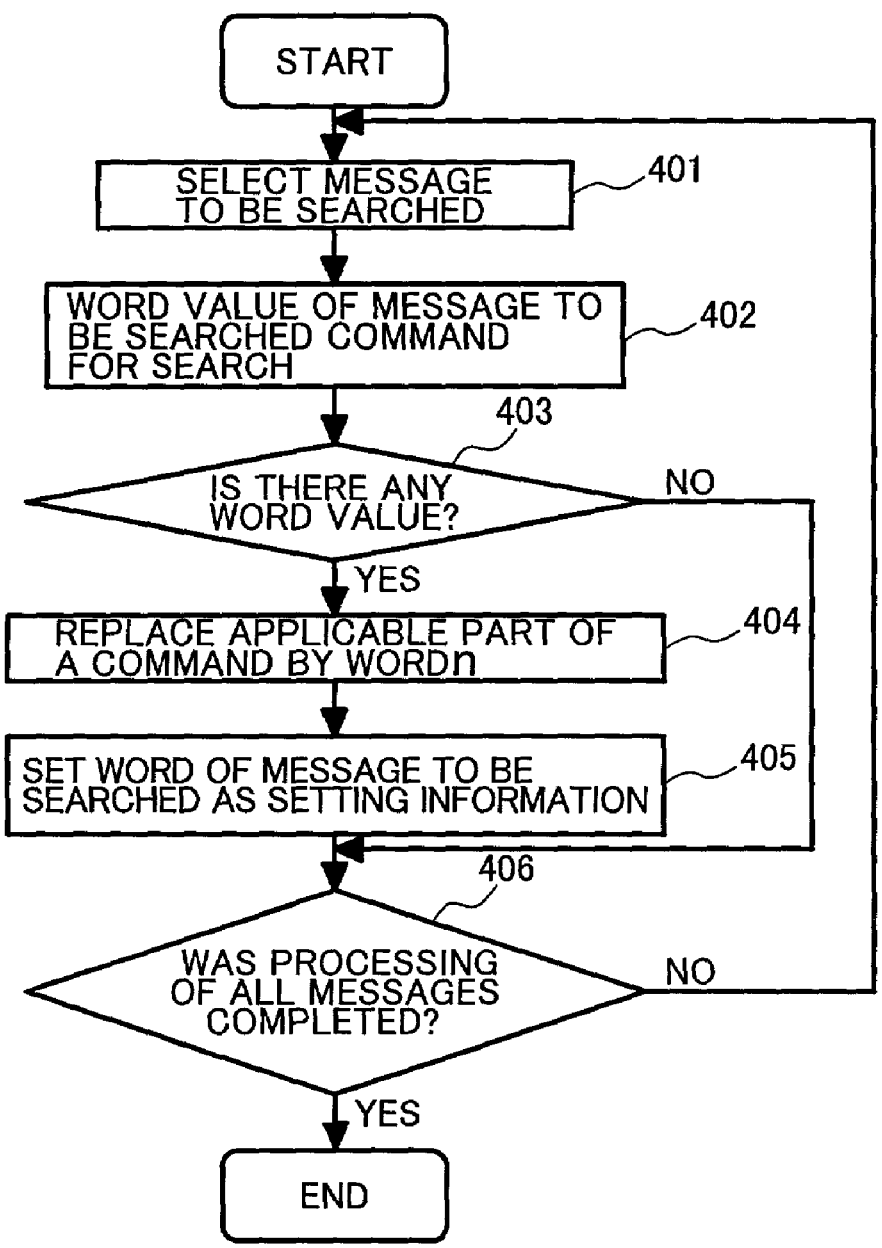
FIG. 12 is a flow chart showing a process flow of the process for generating recovery operation information.

FIG. 12 is a process flow chart of Step 302 in FIG. 11.

In this process, information to be set in the command format 82 of the command format record 80 and information to be set in the setting information 94 of the record 90 of recovery operation information are generated from a command.

Specifically, the values of respective WORDs constituting an error message, a related message and a reply message are searched from a command, and respective information is generated on the basis of the value of WORD included in the command.

First, messages to be searched for the value of WORD included in the command are selected (Step 401).

The messages are selected sequentially in the order of an error message, a related message and a reply message. The value of WORD constituting the selected message to be searched is searched from the command (Step 402).

If the value of WORD of the message to be searched is included in the command, the portion of the command is replaced by WORDn (Step 404), and setting information of "WORDn=keyword" is generated in accordance with the contents of FIG. 8 (Step 405).

Next, it is confirmed whether the process from Step 402 to Step 405 has been carried out or not on all the messages (Step 406). When the process has been carried out, the process is terminated. When the process has not been carried out, the process returns to Step 401.

Figure 13:
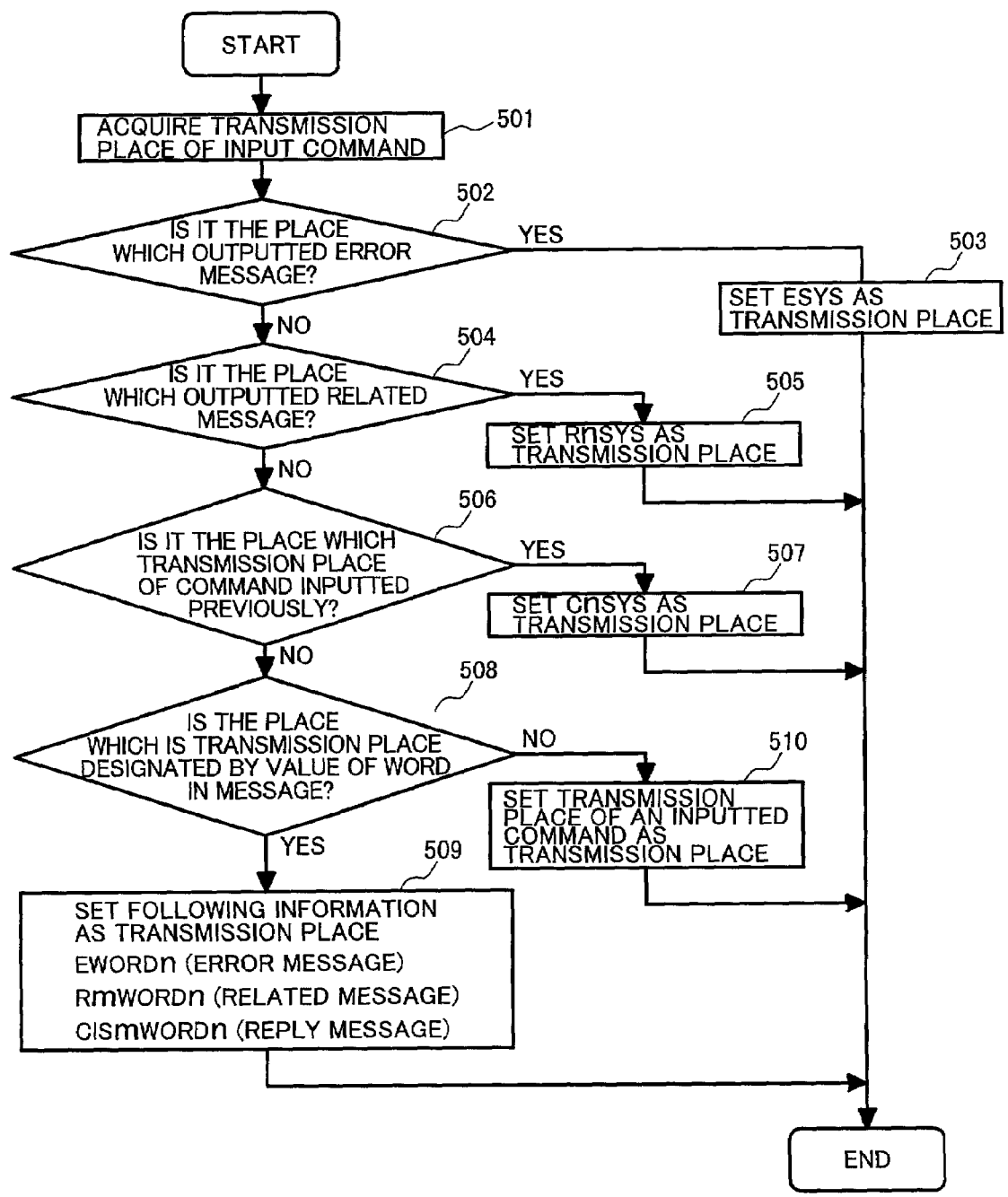
FIG. 13 is a flow chart showing a process flow of the process for generating recovery operation information.

FIG. 13 is a process flow chart of Step 306 in FIG. 11. In this process, information for selecting the transmission place of a command is generated.

First, a transmission place of an inputted command is acquired to generate information for selecting a transmission place (Step 501).

If the transmission place of the inputted command is the place which outputted the error message, "ESYS" designating the place which outputted the error message is set in the transmission place selection information (Step 503). Then, the process is terminated.

If the transmission place of the inputted command is the place which outputted a related message, "RnSYS" designating the place which outputted the related message is set in the transmission place selection information (Step 505). Then, the process is terminated.

If the transmission place of the inputted command is the transmission place of a command inputted previously to the inputted command, "CnSYS" designating the place which outputted the previously inputted command is set in the transmission place selection information of the inputted command (Step 507). Then, the process is terminated.

If the transmission place of the inputted command is the transmission place designated by the value of WORD constituting each message, either "EWORDn", "RmWORDn" or "ClSmWORDn" is set in the transmission place selection information in accordance with the kind of the message on the basis of the keywords of FIG. 8 (Step 509). Then, the process is terminated.

If the transmission place selection information is not any one of "ESYS", "CnSYS", "RnSYS", "EWORDn", "RmWORDn" and "ClSmWORDn", the transmission place of the inputted command is set as the transmission place selection information (Step 510). Then, the process is terminated.

Figure 14:
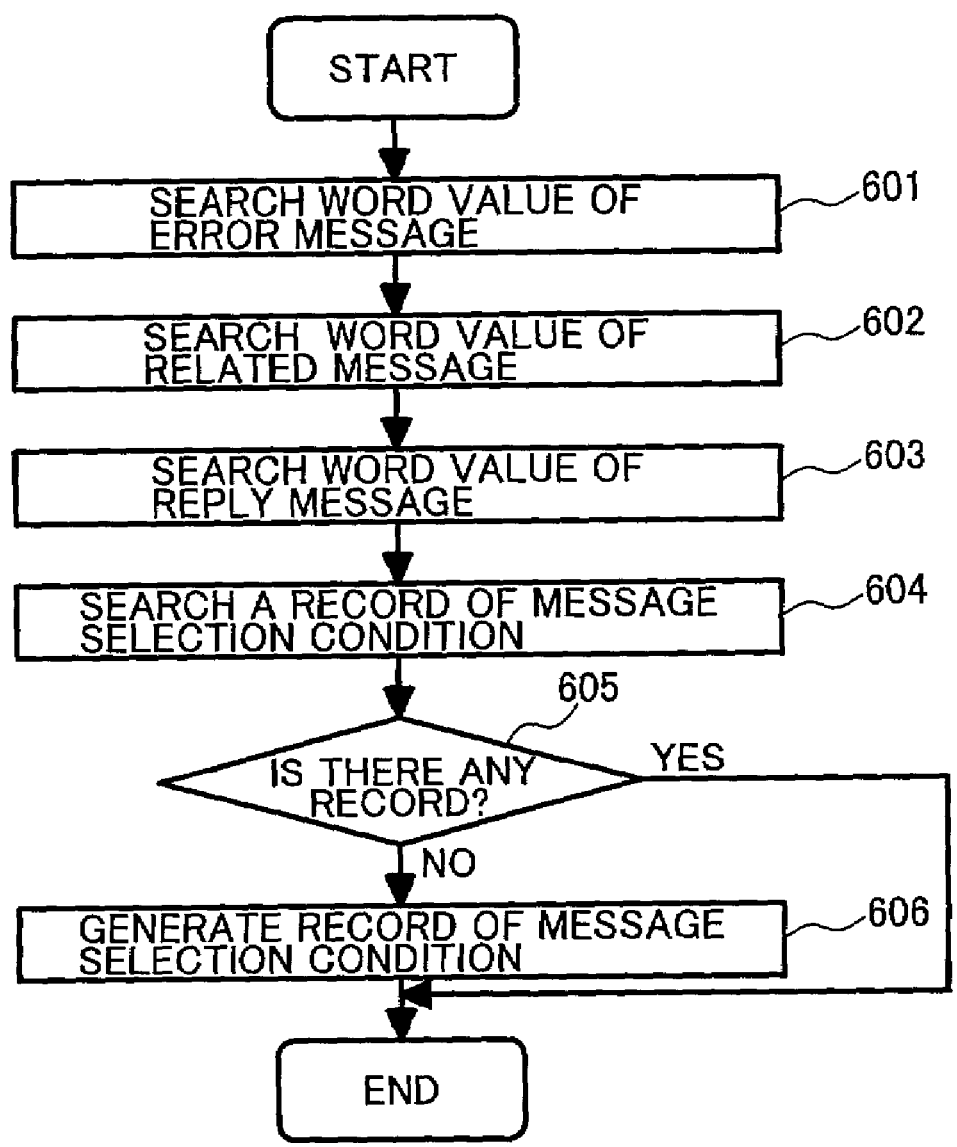
FIG. 14 is a flow chart showing a process flow of the process for generating recovery operation information.

FIG. 14 shows a process flow chart of Step 311 in FIG. 11.

In this process, from the records 70 of message selection condition, a record corresponding to a reply message is searched or generated.

First, from values included in the reply message, the value of WORD in the error message, the value of WORD in the related message, and the value of WORD in a reply message to a command inputted previously are searched (Step 601, Step 602 and Step 603).

Next, the records 70 of message selection condition are searched for a record in which the value of WORD of the reply message other than keywords designating WORD detected in Step 601, Step 602 and Step 603 and the detected values of WORDs is defined in the condition 72 (Step 604).

If such a record of message selection condition is absent, a message selection condition record 70 in which the condition used in Step 604 is defined in the condition 72 is generated and registered (Step 605).

In the process from FIGS. 10 to FIG. 14 described above, recovery operation information in which the error message, the related message, the inputted commands and the reply messages to the commands have been associated is generated.

If a similar error message and a similar related message are generated, this information is searched in the process 16 for searching recovery operation information, and the contents of the information are displayed on the display unit 22 in the input-and-output process 17.

In addition, in accordance with the contents, commands are generated in the process 18 for generating commands, and transmitted to the information processing units 1, 2 and 3 through the communication processes 11, 12 and 13.

The process for transmitting a command to an information processing unit on the basis of the display of recovery operation information will be described with reference to FIGS. 15 to 18.

Figure 15:
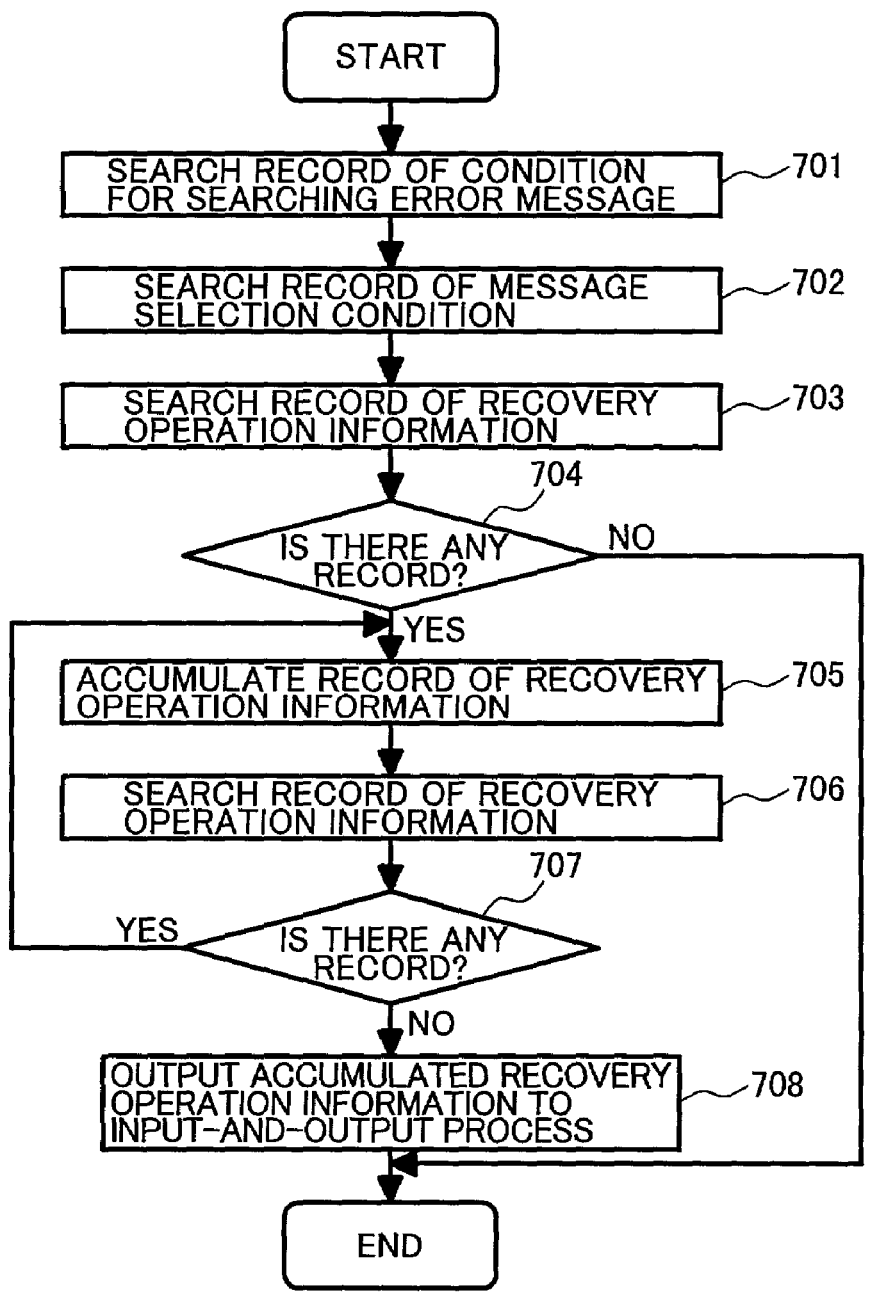
FIG. 15 is a flow chart showing a process flow of the process for searching recovery operation information.

FIG. 15 shows a process flow chart for searching a recovery operation information record corresponding to an error message and its related message in the process 16 for searching recovery operation information.

In the process 16 for searching recovery operation information, the records 60 of condition for searching an error message are searched for a record whose selection condition 62 is in agreement with the error message (Step 701); and the records 70 of message selection condition are searched for a record whose condition 72 is in agreement with the related message (Step 702).

Next, the records 90 of recovery operation information are searched for a record in which the ID 61 of the searched record 60 of condition for searching an error message and the ID 71 of the searched record 70 of message selection condition are set as the condition ID 92 (Step 703).

If such a record 90 of recovery operation information is absent, the process is terminated.

If such a record 90 of recovery operation information is present, the record is accumulated as information to be displayed on the display unit 22 (Step 705).

Next, all the records of recovery operation information including the ID 91 of the detected recovery operation information record 90 in the condition ID 92 are searched (Step 706).

If such a record 90 of recovery operation information is present, the process returns to Step 705, and the detected record is accumulated. Then, all the records 90 of recovery operation information including the ID 91 of the detected record in the condition ID 92 are searched in Step 706.

If such a record 90 of recovery operation information is not detected in Step 706, the accumulated records 90 of recovery operation information are outputted to the input-and-output process 17. Then, the process is terminated.

In the input-and-output process 17, the recovery operation information records 90 searched in the process 16 for searching recovery operation information are displayed on the display unit 22.

Figure 16:
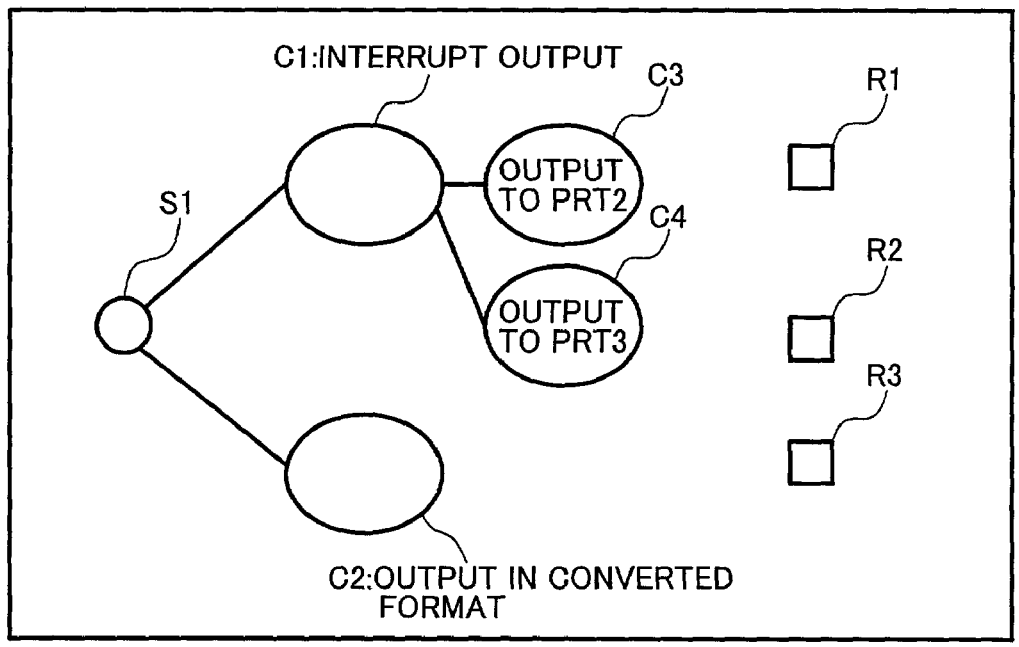
FIG. 16 is a diagram showing an example of display of information for a process of error recovery.

FIG. 16 shows a display example of records 90a, 90b, 90c and 90d of recovery operation information in FIG. 7.

In FIG. 16, the symbol S1 designates a start of recovery operation, and the symbols C1, C2, C3 and C4 correspond to the records 90a, 90b, 90c and 90d of recovery operation information, respectively.

The lines connecting the symbols S1, C1, C2, C3 and C4 designate the order of execution.

For example, the line connecting the symbols C1 and C3 shows that C3 is executed after C1 is executed.

The symbols R1, R2 and R3 correspond to a recovery process constituted by C1 and C3, a recovery process constituted by C1 and C4, and a recovery process constituted by only C2, respectively. One of the symbols R1, R2 and R3 corresponding to a recovery process to be carried out is selected through the keyboard 23 or the mouse 24 by the operator.

The records 90a and 90b of recovery operation information do not include the ID 91 of any other recovery operation information record 90 in the condition ID 92. In addition, the records 90a and 90b have the same contents in the condition ID 92. Therefore, C1 and C2 are displayed to follow S1 and branch therefrom.

The record 90c of recovery operation information includes the ID of the recovery operation information record 90a in the condition ID. Therefore, C3 is executed following C1.

Similarly, C4 is executed following C1.

When the operator selects a recovery process to carry out, the input-and-output process 17 executes the process 18 for generating commands.

Figure 18:
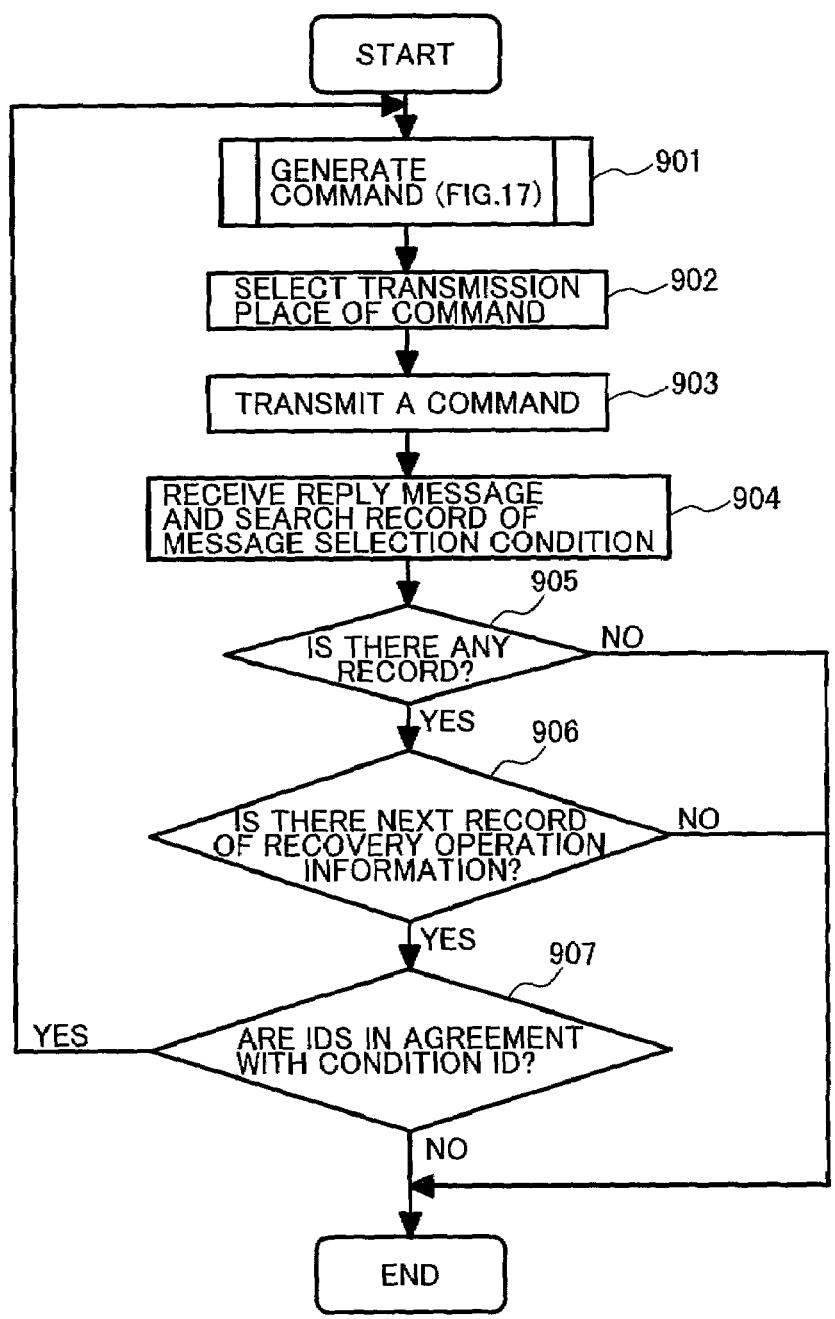
FIG. 18 is a flow chart showing a process flow of the process for generating commands.

In the process 18 for generating commands, the recovery operation information records 90 required for the recovery process are received from the input-and-output process 17, and the process shown in FIG. 18 is carried out.

If R1 in FIG. 16 is selected, the records 90a and 90c of recovery operation information are received.

In the process for generating commands, commands are generated in accordance with the records 90 of recovery operation information (Step 901). The detail of Step 901 will be described with reference to FIG. 17.

Next, an information processing unit which will be a transmission place of a command generated in Step 901 is selected on the basis of the transmission place 95 of the record 90 of recovery operation information (Step 902). The command is transmitted through a communication process corresponding to the selected information processing unit (Step 903).

Next, a reply message to the transmitted command is received, and the records 70 of message selection condition are searched for a record corresponding to the received reply message (Step 904).

If such a record of message selection condition is absent, the recovery process is terminated. If such a record is present, it is confirmed whether a recovery operation information record 90 to be executed next is present or absent (Step 906).

If a recovery operation information record 90 to be executed next is absent, the recovery process is terminated. If such a record 90 is present, it is confirmed whether the ID 91 of the recovery operation information record 90 subjected to the recovery process and the ID 71 of the message selection condition record 70 searched in Step 904 are in agreement with the condition ID 92 of the recovery operation information record 90 to be executed next (Step 907).

If the ID 91 and the ID 71 are not in agreement with the condition ID 92, the recovery process is terminated. If the ID 91 and the ID 71 are in agreement with the condition ID 92, the recovery process is executed again from Step 901 on the recovery operation information record 90 to be executed next.

Next, the process for generating commands in Step 901 in FIG. 18 will be described with reference to FIG. 17.

Figure 17:
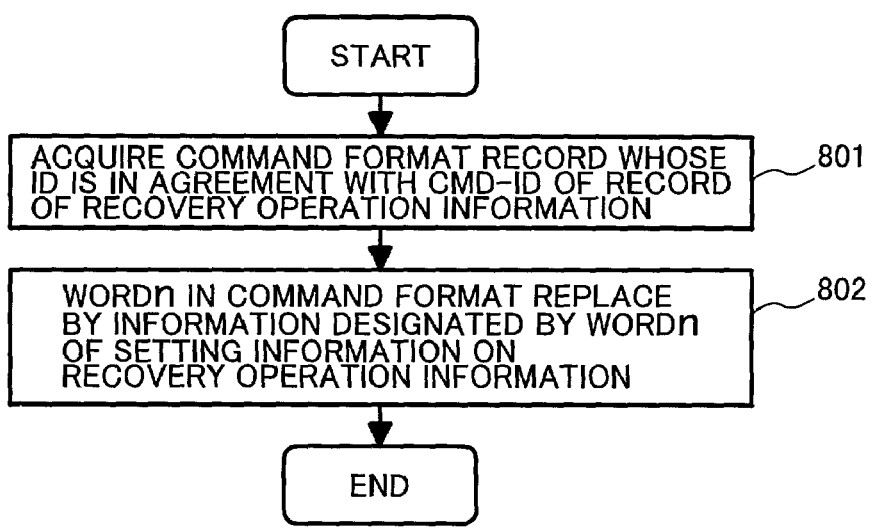
FIG. 17 is a flow chart showing a process flow of a process for generating commands.

FIG. 17 shows a process flow chart for generating commands.

The records 80 of command format are searched for a record in agreement with the CMD-ID 93 of the record 90 of recovery operation information (Step 801).

Next, information defined in the setting information 94 of the record 90 of recovery operation information is substituted for the portion of WORDn of the command format 82 of the acquired record 80 of command format (Step 802).

For example, in the case of the record 90a of recovery operation information, "WORD1=EWORD2" has been defined in the setting information 94. Therefore, the value of the second WORD of the error message is substituted for the portion of WORD1 in the command format 82.

Then, the process for generating commands is terminated.

If an error cannot be recovered in the process described in FIGS. 15 to 18, the operator inputs another command from the keyboard 23 so as to recover the error.

This inputted command is also subjected to the process in FIGS. 10 to 14, and registered as recovery operation information.

Next, an example of the recovery process will be described with reference to FIGS. 7, 16, 17 and 18, on the assumption that the information processing unit 2 outputted an error message "JOB-A PRINT FORMAT ERROR PRT1", and a related message "PRT1 START PRINT JOB-A" was detected from messages outputted by the information processing unit 1.

The error message "JOB-A PRINT FORMAT ERROR PRT1" is a message showing that printing ended in failure because the job "JOB-A" was printed in a format which could not be printed by the printer "PRT1".

The related message "PRT1 START PRINT JOB-A" is a message showing that the printer "PRT1" started an output process of the job "JOB-A".

In FIG. 7, the error message "JOB-A PRINT FORMAT ERROR PRT1" is in agreement with the record 60a of message selection condition, while the related message "PRT1 START PRINT JOB-A" is in agreement with the record 70a of message selection condition.

Thus, of the records 90 of recovery operation information, the records 90a and 90b of recovery operation information whose condition ID 92 is "EMSG=0001" and "RMSG=0001", and the records 90c and 90d of recovery operation information which include the ID 91 "0001" or "0002" of the record 90a or 90b of recovery operation information as "ID=0001" or "ID=0002" in the condition ID 92 are displayed, like the display example of FIG. 16.

In this display example, the symbols R1, R2 and R3 show that a recovery process corresponding to the symbols C1 and C3, a recovery process corresponding to the symbols C1 and C4, and a recovery process corresponding to the symbol C2 are carried out respectively.

Specifically, the recovery process designated by the symbol R1 shows that the print process of the job "JOB-A" in the printer "PRT1" is interrupted, and printing is started again in the printer "PRT2".

The recovery process designated by the symbol R2 shows that the print process of the job "JOB-A" in the printer "PRT1" is interrupted, and printing is started again in the printer "PRT3".

The recovery process designated by the symbol R3 shows that the job "JOB-A" is printed again in a converted format in the printer "PRT1".

When the symbol R1 is selected in FIG. 16 so as to execute the corresponding recovery process, the command format record 80a whose ID 81 is in agreement with the CMD-ID 93 "0001" of the recovery operation information record 90a corresponding to the symbol C1 is acquired in Step 801 in FIG. 17.

Then, since the setting information 94 is defined as "WORD1=EWORD1" in the record 90a of recovery operation information in Step 802, "WORD1" of the command format 82 "STOP WORD1" in the command format record 80a is replaced by "JOB-A" which is the value of the first WORD of the error message, so that a command "STOP JOB-A" is generated (Step 802).

The command "STOP JOB-A" is a command to interrupt the print process of the job "JOB-A".

Next, since the transmission place is defined as ESYS in the record 90a of recovery operation information, the information processing unit 2 which outputted the error message is selected as the transmission place of the generated command in Step 902 in FIG. 18. Then, in Step 903, the command is transmitted to the information processing unit 2 through the communication process 12 corresponding to the information processing unit 2.

Next, a reply message which is a command execution result transmitted from the information processing unit 2 is received (Step 904).

In this example, it is assumed that "JOB-A STOP" is received as the reply message.

Next, it is confirmed whether a message selection condition record 70 in agreement with the contents of the reply message is present or absent (Step 905).

The value "JOB-A" of the first WORD in the reply message is in agreement with the value of the first WORD in the error message, and the value of the second WORD in the reply message is "STOP".

The message selection condition record 70b in agreement with this condition has been defined in FIG. 7. Thus, Step 906 is carried out.

In Step 906, it is confirmed whether a recovery operation information record 90 to be carried out next to the recovery operation information record 90a is present or absent.

In this example, the symbol R1 in FIG. 16 has been selected. Therefore, the recovery operation information record 90c (symbol C3 in FIG. 16) has been defined next to the recovery operation information record 90a (symbol C1 in FIG. 16). Thus, Step 907 is carried out.

In Step 907, it is confirmed whether the ID 91 "0001" in the recovery operation information record 90a subjected to the recovery process and the ID 71 "0002" in the message selection condition record 70b searched in Step 904 are defined as "ID=0001" and "Reply ID=0002" in the condition ID 92 of the recovery operation information record 90c to be carried out next.

Since "ID=0001" and "Reply ID=0002" are defined in the condition ID of the recovery operation information record 90c, Step 901 (Step 801 in FIG. 17) is carried out.

In Step 801 in FIG. 17, the command format record 80c whose ID 81 is in agreement with the CMD-ID 93 "0003" of the recovery operation information record 90c is acquired.

Then, since "WORD1=EWORD1", "WORD2=PRT2" and "WORD3=CPU-A" are defined in the setting information 94 of the recovery operation information record 90a in Step 802, "WORD1", "WORD2" and "WORD3" of the command format 82 "WORD1 PRINT WORD2 WORD3" in the command format record 80c are replaced by "JOB-A" which is the value of the first WORD of the error message, "PRT2" and "CPU-A" respectively, so that a command "JOB-A PRINT PRT2 CPU-A" is generated (Step 802).

The command "JOB-A PRINT PRT2 CPU-A" is a command to execute a print process of the job "JOB-A" in the printer "PRT2" connected to the information processing unit "CPU-A".

Next, since the transmission place is defined as ESYS in the record 90c of recovery operation information, the information processing unit 2 which outputted the error message is selected as the transmission place of the generated command in Step 902 in FIG. 18. Then, in Step 903, the command is transmitted to the information processing unit 2 through the communication process 12 corresponding to the information processing unit 2.

Next, a reply message which is a command execution result transmitted from the information processing unit 2 is received (Step 904).

In this example, it is assumed that "JOB-A START PRINT" is received as the reply message.

Next, it is confirmed whether a message selection condition record 70 in agreement with the contents of the reply message is present or absent (Step 905).

In FIG. 7, there is no record in agreement with the reply message "JOB-A START PRINT". Thus, the process is terminated.

Then, the recovery process in the case where the symbol R1 in FIG. 16 is selected is terminated.

If the symbol R2 in FIG. 16 is selected, a recovery process is carried out in the order of the symbols C1 and C4 in the same manner as the recovery process when the symbol R1 is selected.

If the symbol R3 is selected, only C2 is carried out.

As has been described, according to the present invention, messages related to an error message occurring in an information processing system constituted by a plurality of information processing units can be acquired automatically from all the information processing units.

In addition, commands inputted for the error message can be accumulated in association with the error message and its related messages. Thus, when a similar error message occurs, the contents of recovery operation can be generated and displayed on the basis of the accumulated information.

Further, a command to be inputted for an error message can be generated automatically and transmitted to an information processing unit automatically selected as a transmission place of the generated command. Accordingly, it becomes easy to deal with an error message in an information processing system constituted by a plurality of information processing units. Thus, there are effects of reducing the load on an operator, reducing the potential of wrong operation made by the operator, and improving the reliability of system operation.

In addition, a plurality of information processing units can be monitored by a few operators. Thus, there is also an effect of reducing the cost of system operation.

Further, it becomes unnecessary to look into a manual or a procedure manual for dealing with error messages. Thus, there is also an effect that errors can be dealt with rapidly so that the stop time of the system caused by the errors can be shortened.

It will be further understood by those skilled in the art that the foregoing description has been made on embodiments of the invention and that various changes and modifications may be made in the invention without departing from the spirit of the invention and scope of the appended claims.

We claim:

1. A method for system obstacle correspondence support in a console system having a control unit including a display unit, an input unit, means for acquiring messages from at least one information processing unit, storage means for storing said acquired messages, and a storage unit for storing data for supporting correspondence to an error message indicating an error and acquired from said information processing unit, wherein first data for identifying said error message and second data for identifying a related message related to said error message are included in a part of said data in said storage unit, and a character string constituting said error message is defined as a part of said first data, while a character string constituting a message to be searched as said related message is defined as a part of said second data, wherein when said character string of said first data is included in an error message acquired from said information processing unit, said second data is selected, a message including said character string of said selected second data is searched from said storage means, and said searched message is set as a related message to said error message, and wherein third data, in which said first data is associated with said second data used for searching said related message, is accumulated in said storage unit, and when a command, inputted from said input unit for an error message and a related message in agreement with said third data, includes a character string constituting said error message, said related message, or a reply message to a command inputted previously, a command format in which a portion of said character string included in said command is replaced by information indicating a position of said character string of said error message, said related message or said reply message is accumulated as fourth data in said storage unit.

2. A method for system obstacle correspondence support according to claim 1, wherein when a plurality of commands are inputted for an error message and a related message in agreement with said third data, third data to which information for identifying a reply message to a command inputted previously is added, and fourth data indicating a command following the previously inputted command are accumulated in said storage unit.

3. A method for system obstacle correspondence support according to claim 1, wherein if said information processing unit which is a transmission place of said inputted command is an information processing unit which outputted said error message, information showing that said transmission place of said command is said information processing unit which outputted said error message is added to said fourth data, and said fourth data is accumulated, wherein if said information processing unit which is a transmission place of said inputted command is an information processing unit which outputted a related message to said error message, information showing that said transmission place of said command is said information processing unit which outputted said related message is added to said fourth data, and said fourth data is accumulate, and wherein if said information processing unit which is a transmission place of said inputted command is an information processing unit which was a transmission place of a command inputted previously to said inputted command, information showing that said transmission place of said inputted command is said information processing unit which was a transmission place of a command inputted previously to said inputted command is added to said fourth data, and said fourth data is accumulated.

4. A method for system obstacle correspondence support according to claim 1, wherein if said information processing unit which is a transmission place of said inputted command is an information processing unit designated by a character string constituting said error message, information showing that said transmission place of said command is said information processing unit designated by said character string of said error message is added to said fourth data, and said fourth data is accumulated, wherein if said information processing unit which is a transmission place of said inputted command is an information processing unit designated by a character string constituting a related message to said error message, information showing that said transmission place of said command is said information processing unit designated by said character string of said related message is added to said fourth data, and said fourth data is accumulated, and wherein if said information processing unit which is a transmission place of said inputted command is an information processing unit designated by a character string constituting a reply message to a command inputted previously to said inputted command, information showing that said transmission place of said command is said information processing unit designated by said character string of said reply message to said command inputted previously to said inputted command is added to said fourth data, and said fourth data is accumulated.

5. A method for system obstacle correspondence support according to claim 1, wherein when said error message and said related message to said error message are in agreement with said third data, all of said fourth data corresponding to said third data are selected as correspondence methods to said error message and said related message, and wherein said fourth data selected as said correspondence methods are displayed on said display unit.

6. A method for system obstacle correspondence support according to claim 5, wherein when said third data in which information for identifying said third data used for selecting said fourth data is included as identification information is present, said fourth data corresponding to said third data having said identification information is selected as a correspondence method to be carried out next to said fourth data, and wherein said fourth data selected as said correspondence methods are displayed on said display unit in accordance with an order with which said correspondence method are to be carried out.

7. A method for system obstacle correspondence support according to claim 5, wherein, for a portion of information included in an error message or a related message for which correspondence methods are to be generated or in a reply message to a command carried out previously, which information indicates a position of a specific character string in said error message, said related message or said reply message, a character string in a position designated by said information indicating said position of said error message, said related message or said reply message is substituted to generate a command in accordance with said command format of said fourth data corresponding to a correspondence method displayed on said display unit and selected by said input unit, and wherein an information processing unit to which said generated command is to be transmitted is selected on the basis of information designating a transmission place of a command in said fourth data, and said generated command is transmitted to said selected information processing unit.

8. A method for system obstacle correspondence support according to claim 7, wherein when a correspondence method to be carried out next is present after said command is carried out, said correspondence method to be carried out next is carried out if a reply message to said command is in agreement with information for identifying a reply message to said command in said third data.

9. A method for system obstacle correspondence support according to claim 1, wherein a value of said character string constituting said error message and a position of said value of said character string in said error message are defined as a part of said first data, while a value of a character string constituting a message to be searched as said related message and a position of said character string are defined as a part of said second data, wherein said second data is selected when said value of said character string, defined in said first data, is included in said position of said character string defined in said first data in an error message acquired from said information processing unit, wherein a message, in which said value of said character string defined in said second data, is included in said position of said character string defined in said second data and is searched from said storage means, and wherein said searched message is set as a related message to said error message.

* * * * *